United States Patent
Kim

(10) Patent No.: US 6,208,631 B1
(45) Date of Patent: Mar. 27, 2001

(54) INTRA-CELL INTER-FREQUENCY HARD HANDOFF METHOD IN A CDMA CELLULAR SYSTEM

(75) Inventor: Wan-soo Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/220,402

(22) Filed: Dec. 24, 1998

(30) Foreign Application Priority Data

Dec. 26, 1997 (KR) .................................................. 97-74604

(51) Int. Cl.$^7$ .............................. H04Q 7/00; H04B 7/216
(52) U.S. Cl. .......................... 370/332; 370/335; 370/342
(58) Field of Search ..................................... 370/331, 335, 370/342, 320, 328, 332, 441; 455/436, 437, 443, 450, 438, 439, 440, 441, 442

(56) References Cited

U.S. PATENT DOCUMENTS

| | | | | |
|---|---|---|---|---|
| 5,737,704 | * | 4/1998 | Jin et al. ............................... | 455/450 |
| 5,907,543 | * | 5/1999 | Jeon et al. ............................ | 370/335 |
| 5,970,412 | * | 5/1999 | Maxemchuk ........................ | 455/447 |

* cited by examiner

*Primary Examiner*—Ajit Patel
*Assistant Examiner*—Hanh Nguyen
(74) *Attorney, Agent, or Firm*—Dilworth & Barrese, LLP

(57) ABSTRACT

A method for processing a hard handoff between a moving mobile station and base stations in a code division multiple access is disclosed. In accordance with a preferred embodiment of the present invention, the method of intra-cell-inter-frequency hard handoff includes the steps of setting up a new call, confirming whether a current base station satisfies a condition of inter-frequency hard handoff and whether a currently used frequency in the base station satisfies a condition of inter-frequency hard handoff, and performing a general handoff and call processing, when both the conditions of the two confirming steps are not satisfied. If both conditions of the two confirming steps are satisfied, an output signal strength threshold value on and a distance threshold value are set. The mobile station is instructed to periodically report the base station's output signal strength. The distance between the base station and the mobile station is established and when the base station's output signal strength is less than the set threshold value hard handoff is commanded. However, if it is not less, the base station to mobile station distance is checked with respect to the set distance threshold value. On the contrary, in the event that the base station-mobile station distance is less than the set threshold value, the method returns to the step of estimating the distance between the base station and the mobile station and continues to check the output signal strength of the base station and distance between base station and mobile station.

11 Claims, 3 Drawing Sheets

INTRA-CELL INTER-FREQUENCY HARD HANDOFF METHOD IN A CDMA CELLULAR SYSTEM

FIELD OF THE INVENTION

The present invention relates to CDMA cellular systems, and more particularly to a method for processing a hard handoff between a moving mobile station and base station.

DESCRIPTION OF THE RELATED ART

Generally, hard handoff occurs when a mobile station crosses a boundary of the service area of a base station which currently maintains a connection with the mobile station and enters the service area of another base station. Such handoff enables a mobile station to be given continuous service while moving from the service area of one base station to the service area of another neighboring base station and is typically divided to two types: soft handoff and hard handoff.

A soft handoff, which is possible to perform due to CDMA system's features, establishes a new channel without terminating the original channel. Therefore, the mobile station is in communication with at least one base station during the soft handoff process. On the other hand, hard handoff terminates the original channel before establishing a new channel, and occurs when the frequency channel, frame offset or system are changed.

The handoff is explained with reference to FIG. 1. In FIG. 1, a base station 1 (BS1) operates two frequencies F1 and F2, while a base station 2 (BS2) operates only on one frequency F1. When a mobile station using the F1 and another mobile station using the F2 move to a service area of the base station BS2, handoff is performed in the two mobile stations, respectively as follows.

Firstly, when the mobile station using the frequency F1 moves from a cell 1 to another cell 2. If the output signal strength of base station BS2 is greater than a predetermined threshold value (T_ADD), the mobile station reports the output signal strength of base stations BS1 and BS2 to base station BS1 which currently has a channel with the mobile station. The base station BS1 reports the output signal strength of both base stations BS1 and BS2 received from the mobile station to a base station controller (BSC) (not shown) and the BSC orders the base station BS2 to assign a channel. In response to this order, the base station BS2 assigns the channel and reports the result to the BSC. When the base station BS2 has completed assigning the channel, the BSC orders the mobile station to connect to the channel with the base station BS2 via the base station BS1 that is currently in communication with the mobile station. The mobile station maintains the chancel with the base station BS1 and simultaneously connects a new channel with the base station BS2, and therefore maintains connection with the two base stations BS1 and BS2. If the mobile station moves closer to the base station BS2, the output signal strength of the base station BS1, becomes weaker. The mobile station MS1 reports the output signal strength of the two base stations BS1 and BS2 to the BSC via the base stations BS1 and BS2, when the output signal strength of the base station BS1 is less than a predetermined threshold value (T_DROP).

The BSC orders the base station BS1 to break the channel with the mobile station MS1 and orders, via the base station BS2, the mobile station to break the connection with the base station BS1 and to maintain connection with the base station BS2. In accordance with the order, the mobile station maintains connection with the base station BS2 other than the base station BS1 and handoff from the base station BS1 to the base station BS2 is completed.

Next, there is another case when the mobile station using the frequency F2 moves from the cell 1 to another cell 2. Unlike the mobile station using the Frequency F1, the mobile station is not able to recognize a neighboring cell and accordingly is not able to report the output signal strength of the base station BS2, because the base station BS2 has no output signal on the frequency F2. Handoff does not occur and as the mobile station moves toward base station BS2, the mobile station escapes the service area of the base station BS1 and accordingly the established channel between the base station BS1 and mobile station is discontinued.

Cell configuration of using a different frequency in a certain base station instead of the same frequency of the neighboring base stations is decided by the amount of subscriber demand and when the subscriber demand is greater in the certain area than the neighboring areas, it is very effective and useful.

In a code division multiple access (CDMA) system, handoff is necessary if a mobile station enter a base station BS2 operating with only a frequency F1, while the mobile station maintains a communication channel with base station BS1 operating on a frequency F2. The prior art disclosed in U.S. Pat. Nos. 5,594,718 and 5,680,395, describe a method and apparatus for processing a hard handoff between base stations. The prior art is characterized in that a pilot channel indicating the existence and identity of a base station, frequency F2 is installed in base station BS2 and a mobile station is capable of reporting the base station output signal strength by referring to the pilot channel while moving from the base station BS1 to BS2. A BSC receives a report message concerning the output signal strength of the base stations BS1 and BS2 from the mobile station via the base station BS1 and commands the mobile station to perform an inter-frequency hard handoff from the base station BS1 to BS2, because the BSC already knows that the frequency F2 of the base station BS2 has only the pilot chancel. As a result, the mobile station in the frequency F2 of the base station BS1 is successfully handed off to the frequency F1 of the base station BS2 without discontinuing communication and additionally, this method disclosed in the '718 and '395 patents has an advantage to enable handoff with only the pilot channel without installing a number of channels corresponding to the frequency F2 to the base station BS2. However, this method has problems in that the RF devices should be installed in the frequency F2 pursuant to addition of a pilot channel, and as such, a frequency converter, filters, frequency combiners, amplifiers, etc. should be additionally installed.

U.S. Pat. No. 5,737,704 discloses a channel allocation method for removing inter-cell hard handoffs in a CDMA system. According to the disclosure, each cell is divided into a plurality of concentric circle regions and a first channel (not allocated to a neighboring cell) is allocated to the innermost concentric circle region. A second channel that is allocated to a neighboring cell is allocated to the outermost concentric circle region, and the first and second channels are allocated to the middle concentric region. The first and second regions are selectively varied in order to reduce handoff.

SUMMARY OF THE INVENTION

It is an object of the present invention to provide a method for performing inter-frequency hard handoff based on the output signal strength of a base station and the distance between the base station and mobile station, while avoiding the addition of another device.

According to the preferred embodiment of the present invention, the inter-frequency hard handoff method comprises the steps of: setting up a new call of a base station; confirming whether a current base station satisfies a condition of inter-frequency hard handoff occurrence; confirming whether a currently used frequency satisfies a condition of inter-frequency hard handoff occurrence; if in the step of confirming whether a current base station satisfies a condition of inter-frequency hard handoff occurrence, said condition is satisfied, performing a soft handoff and call processing; if both the conditions of the two confirming steps are not satisfied, setting a threshold value on an output signal strength and on distance; if both the conditions of the two confirming steps are satisfied, instructing the mobile station to periodically report the output signal strength of the base station; estimating the distance between the base station and the mobile station; checking whether the output signal strength of the base station is less than the output signal strength threshold value; commanding a hard handoff when the base station output signal strength is less than the output signal strength the threshold value; checking whether the distance between the base station and mobile station is greater than the distance threshold value when the base station output signal strength is less than the output signal strength threshold value; commanding a hard handoff when the base station-to-mobile station distance is greater than the distance threshold value; performing a soft handoff and processing the call in a common frequency subsequent to the hard handoff command; and returning to the step of estimating the distance between the base station and mobile station, when the base station-mobile station distance is not greater than the distance threshold value.

DETAILED DESCRIPTION OF PREFERRED EMBODIMENTS

Figure 1:
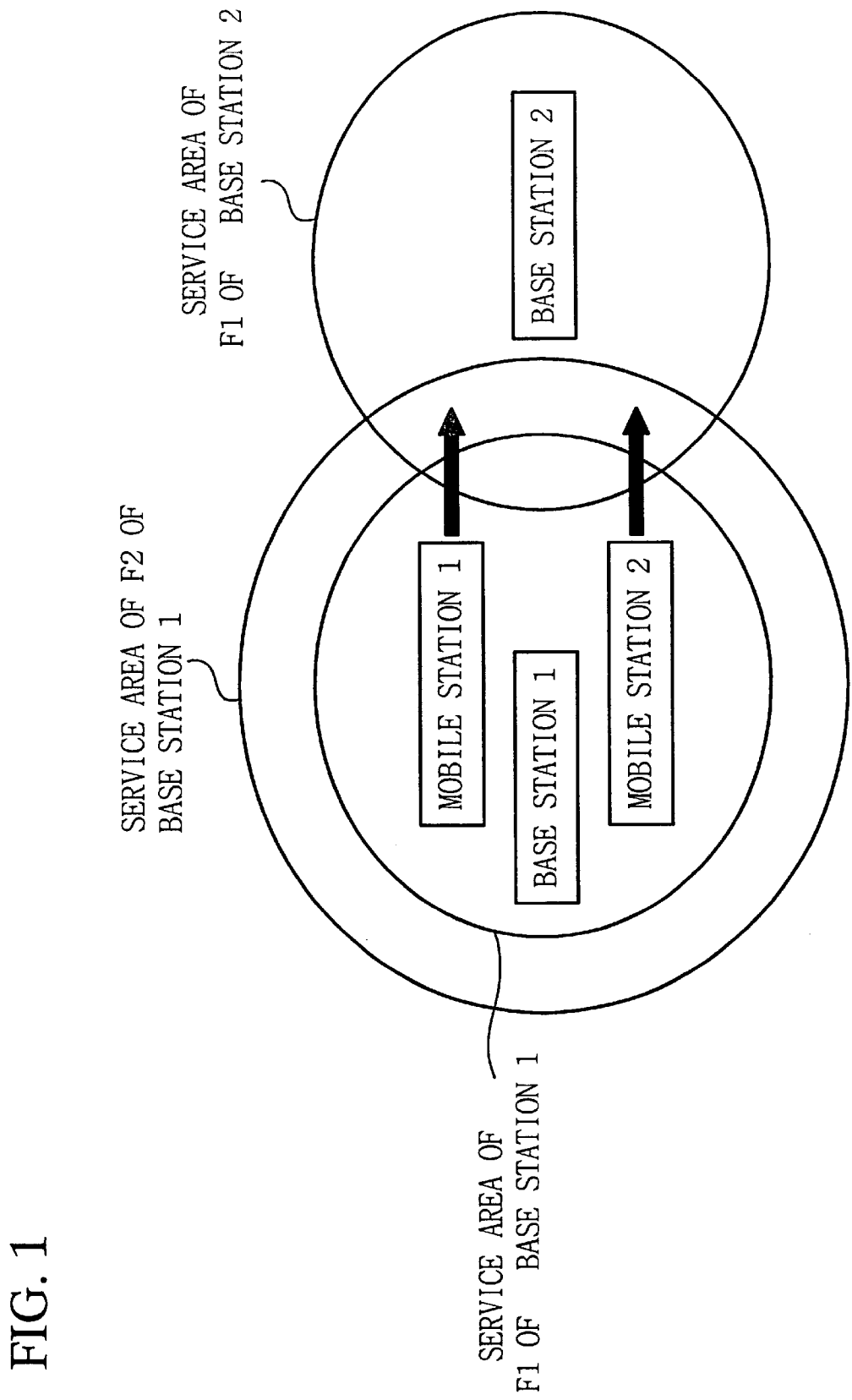
FIG. 1 illustrates the movement of a mobile station from a current cell to a neighboring cell in a CDMA communication system.
Figure 2:
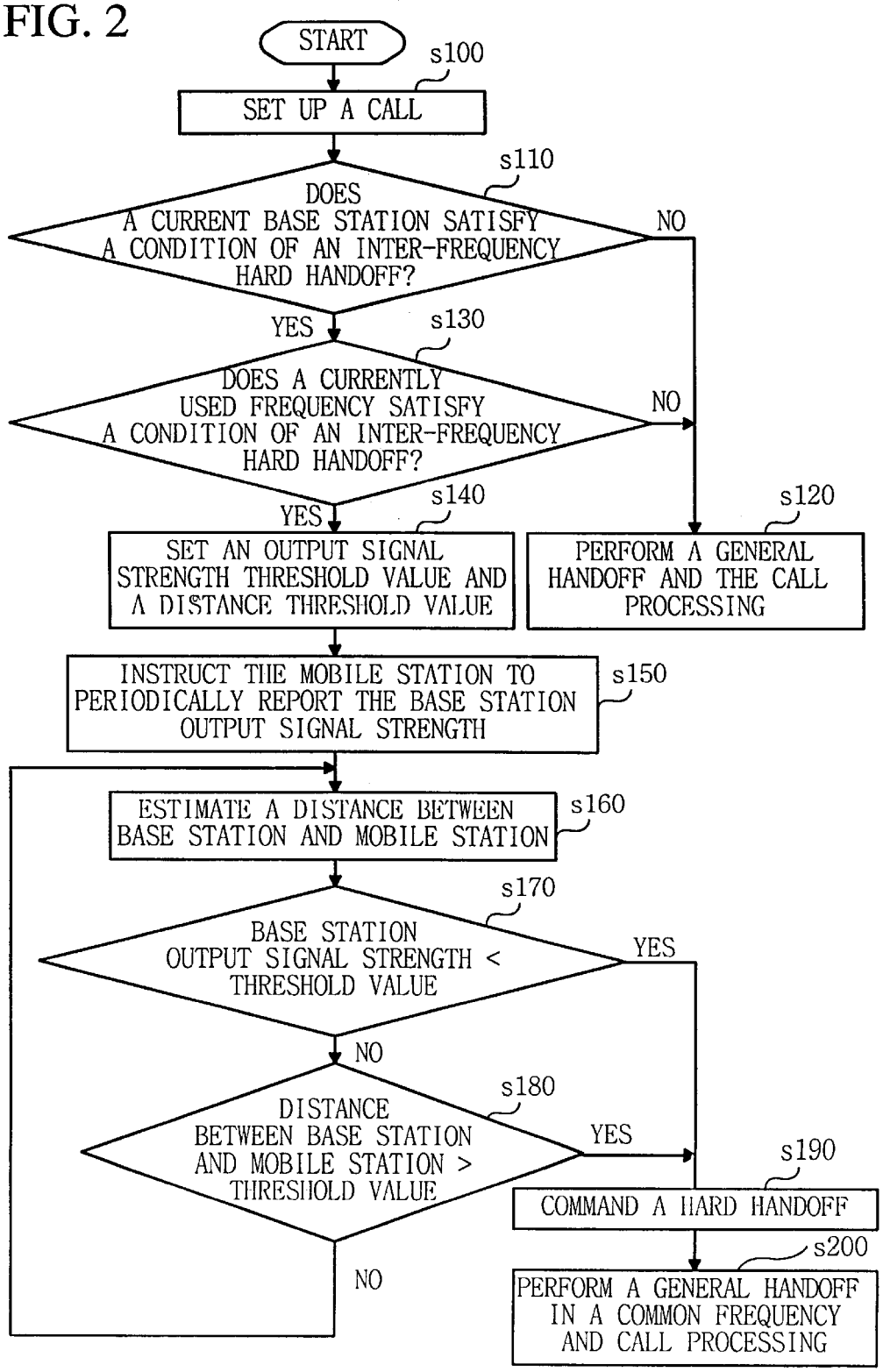
FIG. 2 is a flow chart of processing a hard handoff according to an embodiment of the present invention.
Figure 3:
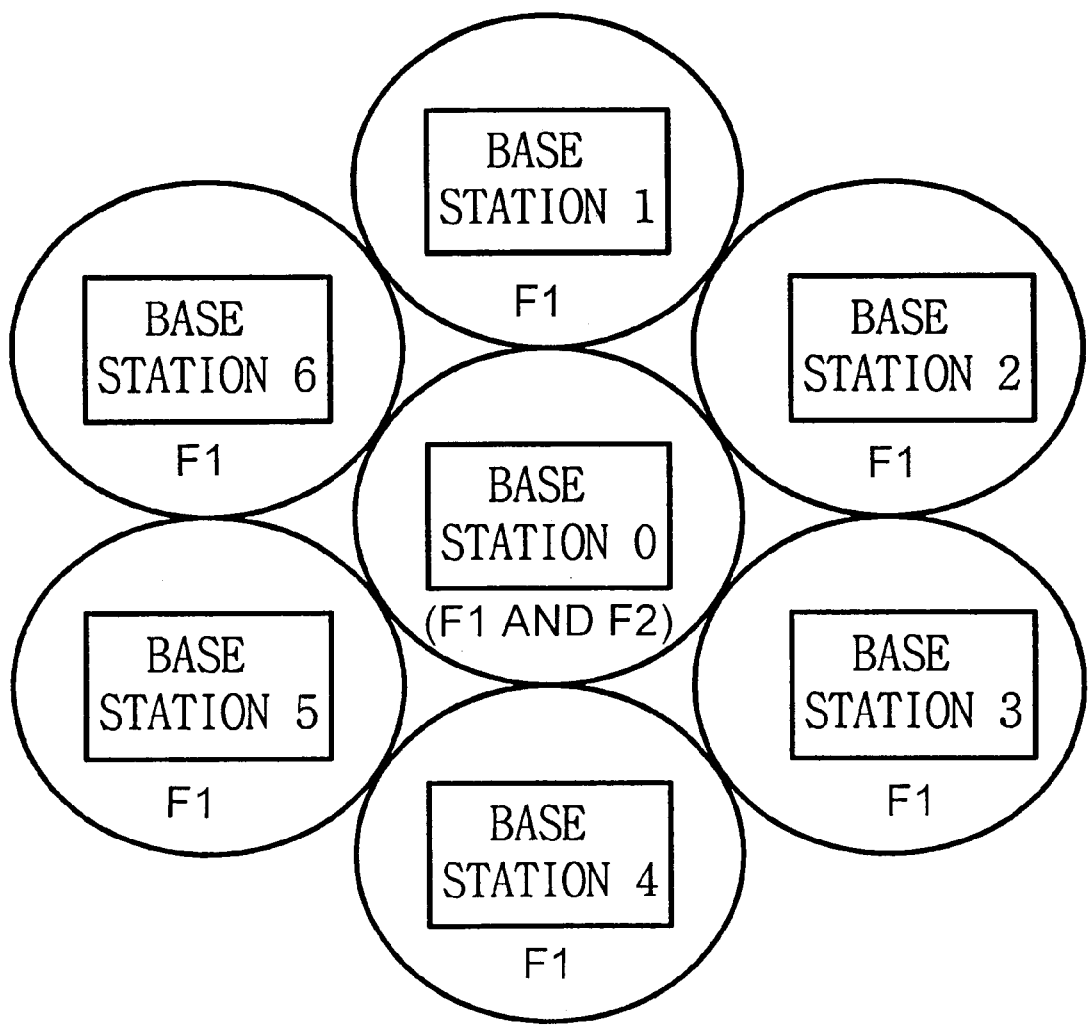
FIG. 3 shows the structure of cells where inter-frequency hard handoff is likely to occur.

Referring to FIGS. 2 and 3, all the base stations use a common frequency F1, while a base station BS0 additionally uses another frequency F2 along with the common frequency F1 because of having a higher amount of subscriber demand. The other frequency F2 is not used in the neighboring base stations, but is used in the base station BS0. When a mobile station has a call in the frequency F2 of the base station BS0, the mobile station maintains a stable connection with the base station BS0 within the service area of frequency F2 used by the base station BS0. If the mobile station moves to a neighboring base station, the distance between the mobile station and the base station BS0 will be greater and the output signal strength of the base station BS0 received by the mobile station will be weaker. The base station BS0 instructs the mobile station to periodically report the output signal strength of the base station BS0 as received by the mobile station, and commands the mobile station to perform a hard handoff to the common frequency F1, when the output signal strength received by the mobile station is less than a predetermined threshold value. Generally, the output signal strength of frequency F2 of the base station BS0 that a mobile station receives depends on the distance from the base station BS0. The greater the distance is, the weaker the signal strength is. However, the environment surrounding the base stations, for example, a road and buildings affects the relation between distance and received output signal strength and is against a general expectation concerning the relation between distance and received output signal strength.

There are described two cases for being against the expectation: firstly, when a mobile station is in the road or open land without obstacles in a straight line from a base station, the distance between the mobile station and the base station becomes greater, but the base station's output signal strength received by the mobile station does not become too weak for communication. On the contrary, when a mobile station stays in a shadow area caused by buildings located between the mobile station and the base station, the base station's output signal strength received by the mobile station will be significantly weaker in spite of a shorter distance between the mobile station and the base station.

In the second case of the aforesaid two, when the base station's output signal strength is less than a threshold value, a hard handoff from a frequency F2 to frequency F1 is performed and the mobile station is located within a service area of the frequency F1. In such a case, the hard handoff performance does not discontinue communication between the mobile station and the base station IBS0. In the first case of the aforesaid two when the base station output signal strength is less than the threshold value, however, if the mobile station performs a hard handoff from the frequency F2 to frequency F1, the mobile station has the potential to be located out of the service area of the frequency F1. This is because the service area of the frequency F2 that has no neighboring stations is far greater than service area of the frequency F1 that have neighboring stations in spite of the same output signal strength of the frequencies F1 and F2.

To solve the problems of the first case, the distance from the base station as well as output signal strength of the base station is taken into consideration upon determining whether to perform inter-frequency hard handoff.

FIG. 2 illustrates a procedure of inter-frequency hard handoff in accordance with the preferred embodiment of the present invention. When a new call is set up (s100), a BSC searches a stored data base and conforms whether the base station currently having the call satisfies a condition of inter-frequency hard handoff (s110). When the base station satisfies the condition of inter-frequency hard handoff, the BSC checks whether the current call is set up in the frequency F2 (i.e., the currently used frequency) (s130). When the current call is not set up in the frequency F2, a soft handoff and a call processing are performed instead of hard handoff (s120). When the current call is set up in the frequency F2, a threshold value on output signal strength of the base station and a threshold value on the distance between the base station and mobile station are set (s140) and the mobile station is instructed periodically to report the received output signal strength of the base station to the base station (s150).

The base station monitors the reported output signal strength and always monitors the distance. The base station continuously estimates the distance between the base station and the mobile station (s160). When the output signal strength is less than the set threshold value on output signal strength (s170) or when the distance is more than the set threshold value on distance (s180), the base station commands the mobile station to perform a hard handoff to the frequency F1 (s190). After performing the hard handoff to the frequency F1 as commanded by the base station, the mobile station recognizes a neighboring base station, because the neighboring base station uses the frequency F1. The mobile station maintains connection with base station without discontinuing communication during hard hand off process from one base station to a neighboring base station As stated above, a mobile station connected with a base station having a common frequency and non-common frequency via the non-common frequency is able to perform a hard handoff without additional devices when moving to a neighboring base station which has no common frequency.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for intra-cell-inter-frequency hard handoff in a code division multiple access cellular system comprising the steps of:

setting up a new call of a current base station;

confirming whether the current base station operates on one or more frequencies that may require an inter-frequency hard handoff;

confirming whether a currently used frequency is not supported by a second base station, thereby implying an inter-frequency hard handoff, when the current base station operates on one or more frequencies that may require an inter-frequency hard handoff;

performing a soft handoff and call processing, when the currently used frequency is supported by the second base station;

setting a threshold value on a base station output signal strength and on distance, when said the current base station operates on a frequency that is not supported by the second base station;

instructing a mobile station to periodically report said base station output signal strength of the current base station;

estimating a distance between said current base station and said mobile station;

checking whether the output signal strength of said current base station is less than said output signal strength threshold value;

commanding a hard handoff when said base station output signal strength is less than said output signal strength threshold value;

checking whether the distance between said current base station and the mobile station is greater than said threshold value on distance;

commanding a hard handoff when the base station-to-mobile station distance is greater than said threshold value on distance;

performing a hard handoff and processing said call in a common frequency subsequent to said hard handoff command; and returning to said step of estimating when said base station-to-mobile station distance is not greater than said threshold value on distance.

2. The method as set forth in claim 1, wherein in said step instructing said mobile stations further comprises the step of continuously checking for changes of said base station output signal strength in the current base station.

3. The method as set forth in claim 1, wherein the distance between said base station and mobile station is estimated through a radio wave round trip delay.

4. The method as set forth in claim 1, wherein said inter-frequency hard handoff performance is decided based upon the base station output signal strength and the base station-to-mobile station distance.

5. The method as set forth in claim 1, wherein said step of commanding of hard handoff when said current base station output signal strength is less than said threshold value on output signal strength is performed from a non-common frequency to a common frequency.

6. The method as set forth in claim 5, wherein after said hard handoff from said non-common frequency to said common frequency, said mobile station is located within a service area of said common frequency.

7. The method as set forth in claim 6, wherein said mobile station subsequently maintains connection with said base station and is given communication service during the inter-frequency hard handoff process.

8. The method as set forth in claim 1, further comprising the step of initiating a data base search upon said call is set up.

9. The method as set forth in claim 1, wherein said step of commanding hard handoff in the event that said distance between said base station and mobile station is greater than said threshold value on distance is performed from a non-common frequency to a common frequency.

10. The method as set forth in claim 9, wherein said mobile station recognizes a neighboring base station when said hard handoff is performed from said non-common frequency to common frequency.

11. The method as set forth in claim 10, wherein said mobile station subsequently maintains connection with said current base station and is given communication service during the inter-frequency hard handoff process.

* * * * *